(12) United States Patent
Ocher et al.

(10) Patent No.: US 8,819,155 B2
(45) Date of Patent: Aug. 26, 2014

(54) SYSTEM AND METHOD FOR PERFORMING CENTRALIZED COMMON TASKS FOR A SET OF FUNCTIONS

(75) Inventors: Alexander Ocher, San Jose, CA (US); Frank Buchholz, Wiesloch (DE); Werner Daehn, Brey (DE); Wu Cao, Redwood City, CA (US); Ben Hofmans, Bornem (BE)

(73) Assignee: Business Objects Software Limited, Dublin (IE)

( * ) Notice: Subject to any disclaimer, the term of this patent is extended or adjusted under 35 U.S.C. 154(b) by 165 days.

(21) Appl. No.: 13/329,055

(22) Filed: Dec. 16, 2011

(65) Prior Publication Data

US 2013/0159385 A1   Jun. 20, 2013

(51) Int. Cl.
*G06F 15/16*   (2006.01)
(52) U.S. Cl.
USPC .............................. 709/206; 718/102; 726/22
(58) Field of Classification Search
USPC ......................................................... 709/203
See application file for complete search history.

(56) References Cited

U.S. PATENT DOCUMENTS

| | | | |
|---|---|---|---|
| 2009/0265696 A1* | 10/2009 | Grice | 717/156 |
| 2009/0319766 A1* | 12/2009 | Ward et al. | 713/2 |
| 2010/0175045 A1* | 7/2010 | Ciolfi et al. | 717/105 |
| 2010/0205606 A1* | 8/2010 | Panzer | 718/102 |
| 2011/0067104 A1* | 3/2011 | Goncalves et al. | 726/22 |
| 2011/0131268 A1* | 6/2011 | Kruempelmann | 709/202 |
| 2011/0246976 A1* | 10/2011 | Kibbar | 717/170 |
| 2011/0271184 A1* | 11/2011 | SiMa et al. | 715/705 |
| 2011/0276971 A1* | 11/2011 | Berg et al. | 718/102 |
| 2013/0086558 A1* | 4/2013 | Merino et al. | 717/128 |

* cited by examiner

*Primary Examiner* — Hamza Algibhah
(74) *Attorney, Agent, or Firm* — Fountainhead Law Group PC

(57) ABSTRACT

Methods, systems, and apparatuses for processing function calls using a hooking routines to perform pre-execution tasks are disclosed. A server computer receives a function call including a hooking routine and a request to run a particular function from a client computer. Based on a function group identifier and the credentials of the user or client computer, the server computer can perform various pre-execution tasks. The tasks can be common to all functions in the function group or be customized Both pre-execution tasks can be stored remotely from the client computer, so that updates to the pre-execution task can be made without the need to update computer readable code stored on the client computer. If the pre-execution tasks, such as an authorization, passes, then the server computer can execute the requested function, the server computer can reject or abort the requested function.

18 Claims, 4 Drawing Sheets

SYSTEM AND METHOD FOR PERFORMING CENTRALIZED COMMON TASKS FOR A SET OF FUNCTIONS

CROSS REFERENCE TO RELATED APPLICATIONS

Not Applicable

BACKGROUND

The present invention relates to processing of function calls sent to a server from a client computer and determining whether that client computer or the user using the client computer is authorized to run the particular operations required by the function call.

In the development and deployment of server-based computer software applications, developers provide end-users with functions groups that can be called or otherwise invoked individually or as part of a routine from a user's client computer via a network. Function groups are sets of related functions that, when executed on the server computer, often perform common tasks. Some of these common tasks can be determined in advance. In such conventional server-based software deployments, the routines and external functions calls for such tasks are hard-coded into the software applications deployed on the client computers. However, some of the common tasks may not be needed, or even conceived of, prior to the deployment of the function groups to the client computer. Accordingly, there are scenarios in which the common tasks need to be updated or changed.

For example, some security, authorization, and authentication tasks may be hard-coded or otherwise included in the initial compiled deployment of the software applications. However, as the security needs of the user change, or as new security threats are revealed, common security tasks associated with the function group may need to be updated, changed, or replaced. When the common tasks are hard-coded into each of the functions in the functions groups, each change or update requires rewriting or recompiling the code for the functions resident on client or the server computer. Such changes or updates can require augmenting, rewriting, or recompiling many lines of code which is not only time consuming and arduous, but is also extremely error prone.

Hard-coding the common tasks not only makes updating or changing commons task difficult, it also prevents fast and efficient customization of the common tasks for a particular function groups to the needs or requirements of a particular user, because it would require creating unique function groups with custom common tasks for each client. Embodiments of the present disclosure address these and other drawbacks of conventional server-based software applications deployments.

SUMMARY

Embodiments of the present disclosure are directed toward methods for processing a function call on a server computer. Such methods include receiving a function call including a function group identifier from a client computer and executing a common pre-execution task in response to the function call and the function group identifier, using the server computer. The common pre-execution task can be associated with a plurality of functions in the function group associated with the function group identifier. In some embodiments, the method includes determining a set of credentials in response to the function call and the function group identifier and the executing a customized pre-execution task in response to the common authorization check routine and the set of credentials. The common pre-execution task can include an authorization routine associated with the of functions associated with the function group identifier. The customized pre-execution task can include an enhanced authorization and security check routines specific to the set of credentials associated with the requesting user or client computer.

In various other embodiments, the function calls can include a hook routine that can be used to trigger the execution of the pre-execution task. When triggered by the detection of the hook routine in the function call, the server computer can retrieve the common and customized pre-execution tasks from a task storage medium remote from the client computer and then execute the tasks. The methods can also include updating the common and custom pre-execution tasks stored in the task storage medium in response to a request received by the server computer from a user using the client computer. In such embodiments, the common and custom pre-executing tasks, such as security and authorizations checks, can be updated, augmented or changed without having to change software stored on any client computers.

Other embodiments are directed toward system and server computers for practicing various method described herein.

DETAILED DESCRIPTION

Described herein are systems and methods for creating, processing and executing common and custom tasks for function groups.

In the following description, for purposes of explanation, examples and specific details are set forth in order to provide a thorough understanding of various embodiments. It will be evident, however, to one skilled in the art that the present invention as defined by the claims may include some or all of the features in these examples alone or in combination with other features described below, and may further include modifications and equivalents of the features and concepts described herein.

Various embodiments of the present disclosure are directed toward processing common, user-specific, and function-specific tasks, such as checking authorizations for a particular function to execute or for a particular user to request the execution of a particular function. Using a hooking routine, when a function call specifying a specific function or combination of functions is received at a server computer from a client computer, a screening module in the server computer can check if there are common tasks to be performed prior to allowing the specified function to execute.

If there are common tasks to be performed, such as a common authorization check, the screening module can designate that a particular common task or set of common tasks be performed by other modules of the server computer prior to the function being allowed to execute or perform any operations. In some embodiments, all functions can call a centralized authorization routine that will execute authorization checks common to all functions.

In related embodiments, the screening module can also use a hooking routine to determine that there are customized tasks, such as function-specific or user-specific security checks, that should be performed before the function is allowed to proceed. If the screening module determines that there are any function-specific or user-specific tasks associated with the specified function, or the user who specified the function, then the screening module can designate one or more modules of the server computer to perform any such tasks prior to the function being allowed to execute.

In any of such embodiments, if the common, user-specific, or function-specific tasks indicate a failure, error or denial, the screening module, or another module of the server-computer, can request more information from the user, such as more detailed or corrected credentials, or simply abort the processes. In such embodiments, the screening module, or another module, can provide feedback to the user in the form of an error message or error code.

Figure 1:
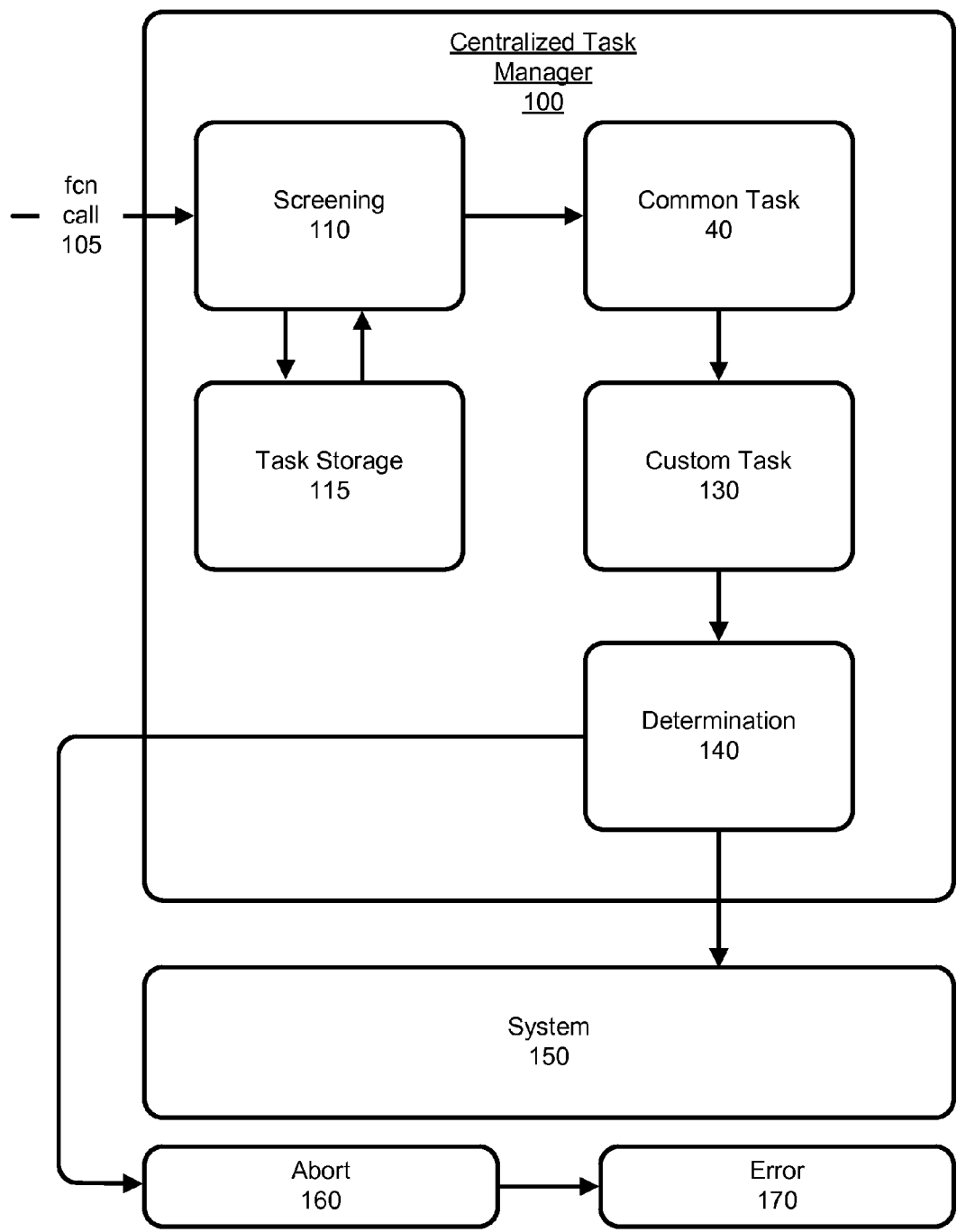
FIG. 1 illustrates a centralized task management system, according to various embodiments of the present invention.

FIG. 1 is a schematic of a system according to various embodiments. As shown, the centralized task manager 100 can include a number of modules that can be implemented in various combinations of software, firmware, hardware, and computers configured with such components. The centralized task manager can be hosted or implemented in a server computer connected to one or more networks. In such embodiments, the centralized task manager 100 can be coupled to a bus or to a network interface. In any of such embodiments, centralized task manager 100 can receive function calls 105 from one or more client computers over one or more networks. Such networks can include secured and unsecured connections over open standard and proprietary networks.

Screening module 110 can receive function call message 105. For clarity, the terms function call and function call message can be used interchangeably to describe an electronically stored or transmitted data that can include routing, processing, hooking and payload data. The function call can include one or more data packets. Accordingly, the function call 105 can include various data, including but not limited to data that screening module 110 can use to initiate a hooking routine. As used herein, a hooking routine is a process of intercepting messages or data that are intended for another component, module, or entity, and using at least some of the message or data to initiate another parallel or serial processes. The part of the message or data used to initiate the hooking process is referred to herein as the "hook." As such, function call 105 can include a hook that can be a flag or particular sub-function call in the function call that the screening module 110 can detect to initiate one or more pre-execution tasks.

In some embodiments, the function call 105 can include a request for one or more functions associated with a function group. The function group can be associated with a function group identifier. Each function associated with the function group or the function group identifier can include a hook that will indicate to the screening module 110 to perform certain tasks or operations prior to allowing the function to execute. In some embodiments, the screening module 110 can look for a particular call to a routine common to all functions within a function. The particular routine common to all functions within the function group can be the hook. For example, all functions within a function group can be configured to call a common permission or authorization check. If the screening module determines that there are common pre-execution tasks in response to detecting or receiving an indication of a hook routing, then screening module 110 forwards the function call or initiates another or augmented function call to one or more of the other modules in centralized common task manager 100 to execute the designated pre-execution tasks. Such pre-execution checks can include a pre-execution authorization or permission check.

In some embodiments, screening module 110 can detect a hook in the function call 105 to initiate a pre-execution task. The function call 105 can also include a function group identifier or a user identifier. If the screening module 110 detects a hook in the function call 105, then screening module 110 can access task storage 115 to determine what, if any, common or customized tasks or operations are to be performed before the function or functions specified in the function call 105 are executed or otherwise allowed to run. Task storage 115 can store and correlate one or more functions based on the function group identifier and/or the user identifier included in the function call 105. The correlation between the function group identifier and the required pre-execution tasks to be performed can be stored in a table in the task storage 115. Similarly, task storage 115 can also store tables that correlate pre-execution tasks to user identifiers.

Based on the function group identifier or user identifier, the screening module 110 can access and retrieve common, user-specific, and function-specific pre-execution tasks from to perform or forward to other modules within centralized task manager 100 for execution. For example, based on the function group identifier, the screening module can access task storage 115 to determine that the particular function or functions associated with the function group identifier included in the function call 105 require an authorization or permission check common to or associated with some or all functions in the function group associated with the function group identifier. The authorization or permission check can include a set of security routines that can be executed by the centralized task manager 100, another component of the server computer on which the task manager 100 is hosted or located, or on a remote server computer. In some embodiments, any and all of the functionality of the centralized task manager 100 and other functionality described herein, can be performed by virtual instances of a server in a cloud-computing environment.

Screening module 110 can send instructions to common task module 120 to execute the pre-execution tasks common to all functions associated with a particular function group and function group identifier. In some embodiments, the pre-execution common tasks can include security, authorization, and permission checks. In such embodiments, the pre-execution tasks can perform the checks based on multiple factors, including, but not limited to, user credentials, client computer credentials, the type of the data requested, the availability of the data requested, and the availability of the resources needed to retrieve, access, or process the data requested. Based on the outcome of the common checks, the screening module can send instructions to the custom task module 130 to execute any pre-execution custom checks specific to the requested function or the user or client computer that requested the function.

The instructions to the custom task module 130 can include pre-execution checks specific to the needs of the user or client computer, such as enhanced security, authorization and permission checks. Such enhanced security, authorization and permission checks are of particular importance to users in information sensitive industries like banking, stock exchanges, national security agencies and energy producers. Such checks can be performed by the custom task module 130 or by another module or server computer under the management the custom task module 130.

The results from the common and custom pre-execution tasks can be returned to the determination module 140. Determination module 140 can then analyze the results of the common and custom pre-execution tasks to determine whether the requested function can proceed. If the determination module 140 determines that the results of the pre-execution common and custom tasks are acceptable, then the determination module 140 can send instructions to system 150 to execute the requested functions. In various embodiments, system 150 can include one or more server computers with access to various resources, such as databases and other server computers.

In the event that determination module 140 determines that the results of the common and custom pre-execution tasks are unacceptable, then determination module 140 can send a notification message to abort module 160. Abort module 160 can send instructions to error module 170 to prepare an error message to send to the user or client computer that requested the function that the requested function has been rejected or aborted. In other embodiments, not shown, any of the modules of centralized task manager 100 can be coupled to or communicate with error module 170 to initiate an error message. In some embodiments, the error message can include an error explanation or error code to indicate to the user or client computer the reasons why one or more of the pre-execution tasks failed or were rejected. In some embodiments, the common tasks must return acceptable results before the custom task can be performed. In this way, the centralized task manager 100 can reject or abort the requested function before the custom tasks are executed, thus conserving computing resources on the server computer.

In various embodiments, the common and custom tasks, as well as the correlation between the requested functions and the common and custom tasks, can be stored in the centralized task manager 100 or on another server computer. In such embodiments, the listing of the specific common and custom pre-execution tasks can be updated, augmented or changed by accessing the centralized task manager 100 to change the specified common and custom pre-execution tasks. The common tasks can be can be updated by the operator of the centralized task manager 100. In related embodiments, custom, user-specific, or function-specific, pre-execution tasks or task specifications can be updated by the users or the operators of the centralized task manager 100. Such changes can be made through a user interface hosted on the centralized task manager 100 without the need to update or change the actual code resident or deployed on the client computers. These features provide greater flexibility, customization and maintenance in processing functions than conventional function processing systems and methods.

Figure 2:
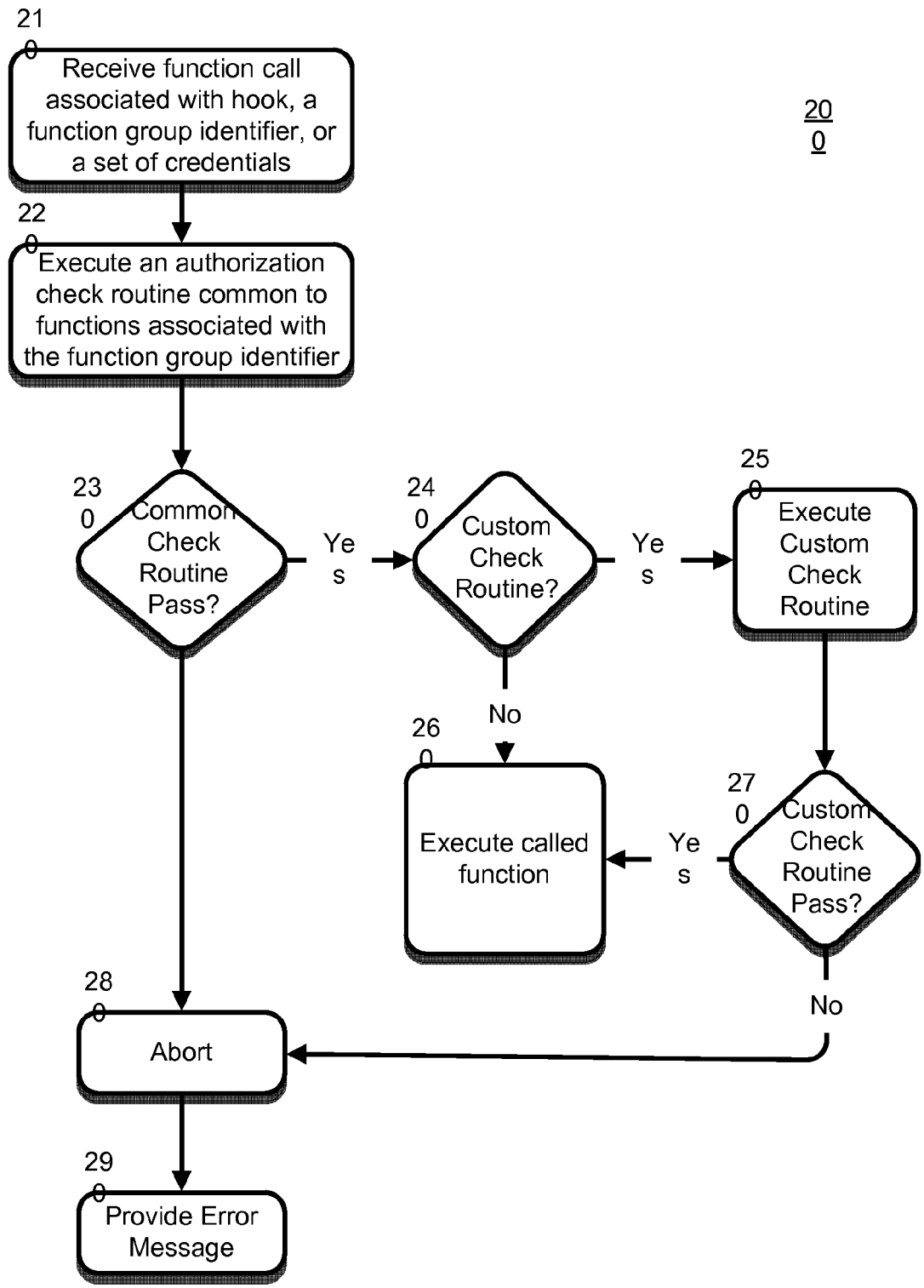
FIG. 2 is a flowchart of a method for centralized task management, according to various embodiments of the present invention.

FIG. 2 is a flowchart of a method 200 for processing common and custom pre-execution tasks according to various embodiments of the present invention. At action 210, a server computer hosting a centralized task manager can receive a function call associated with a function group identifier and a set of credentials. In such embodiments, receiving the function call can include receiving or detecting a hook routine or hook code that the server computer can use as a trigger to an authorization check routine common to the functions associated with the function group identifier. In some embodiments, the hook routine or hook code can include business add-ins (BAdI) code. BAdI code can include hooking functionality for customizing deployments of SAP products. Once the a function call with a triggering hook is received or detected, then the server computer can execute an pre-execution authorization check routine common to the functions specified in the function call and/or associated with the function group identifier, at action 220. Such pre-execution authorization check routines can be executed using data provided by the user or client computer included with or separate from the function call. The data can be included in the function call as a parameter passed from the client computer.

In the event that the common check routine or task fails, then the server computer can reject or abort the function specified in the function call at action 280, and then provides an error message to the user in action 290. In the event that the common check routine or task is successful or otherwise returns an acceptable result in action 230, then the server computer can check if there are any custom check routines associated with the specific user, client computer or function, in action 240. If there are no custom check routines to execute and the common check routines all passed, then the server computer can execute the requested function specified in the function call, in action 260. If there are custom pre-execution checks to perform, then the server computer can execute the custom check routine in action 250. In action 270, the server computer can determine if the custom check routine passes. If the sever computer determines that the custom check routine passes, then the server computer can execute the called function in action 260. If the server computer determines that the custom routine fails in action 270, then the server computer can abort the requested function in action 280 and provide an error message in action 290.

Figure 3:
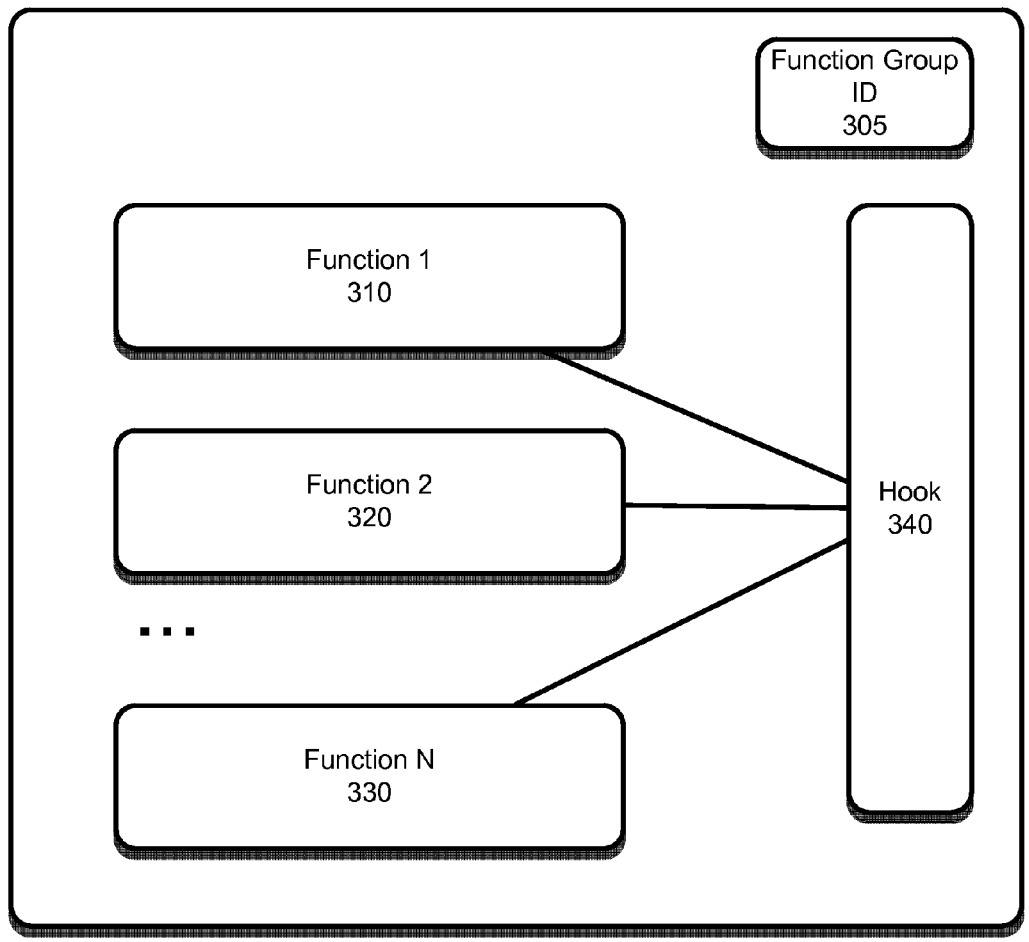
FIG. 3 illustrates a function group with a common task hook routine according to various embodiments of the present invention.

FIG. 3 is a schematic representation of a function group 300 that can be implemented in various embodiments. As shown, the function group 300 can include a number of functions, such as function 1 310, function 2 320, through function N 330. The function group 300 can include any number of related and unrelated functions that can be produced, compiled and deployed to a number of different user and different client and server computers operated by the different users. As shown, the function group 300 can include an associated function group identifier 305. The function group identifier 305 can be unique to the function group or indicate a class of function groups to which the particular function group belongs. Additionally, any of the functions in function group 300 can be associated or linked to a hook routine 340 that can be included in any function call that the client computer sends to a server computer for processing. In such embodiments, the hook routine is compiled with each function so that the execution of the hook routine is automatic when a function is run.

The hook routine 340 can include one more computer executable codes or code segments that can be included in the function call or command the client computer. The hook routine 340, when included in the function call sent to a server computer, can trigger a pre-execution check routine that can be run and qualified before any of the functions of the function group 300 are executed according to a specification in a function call.

The apparatuses, methods, and techniques described herein may be implemented as a computer executable code or programs (software) executing on one or more computers. The computer executable code or programs may further be stored on a non-transitory computer readable medium. The non-transitory computer readable medium may include instructions for performing the processes described.

The computer system may comprise a software server. A number of software servers together may form a cluster, or logical network of computer systems programmed with software programs that communicate with each other and work together to process requests.

Figure 4:
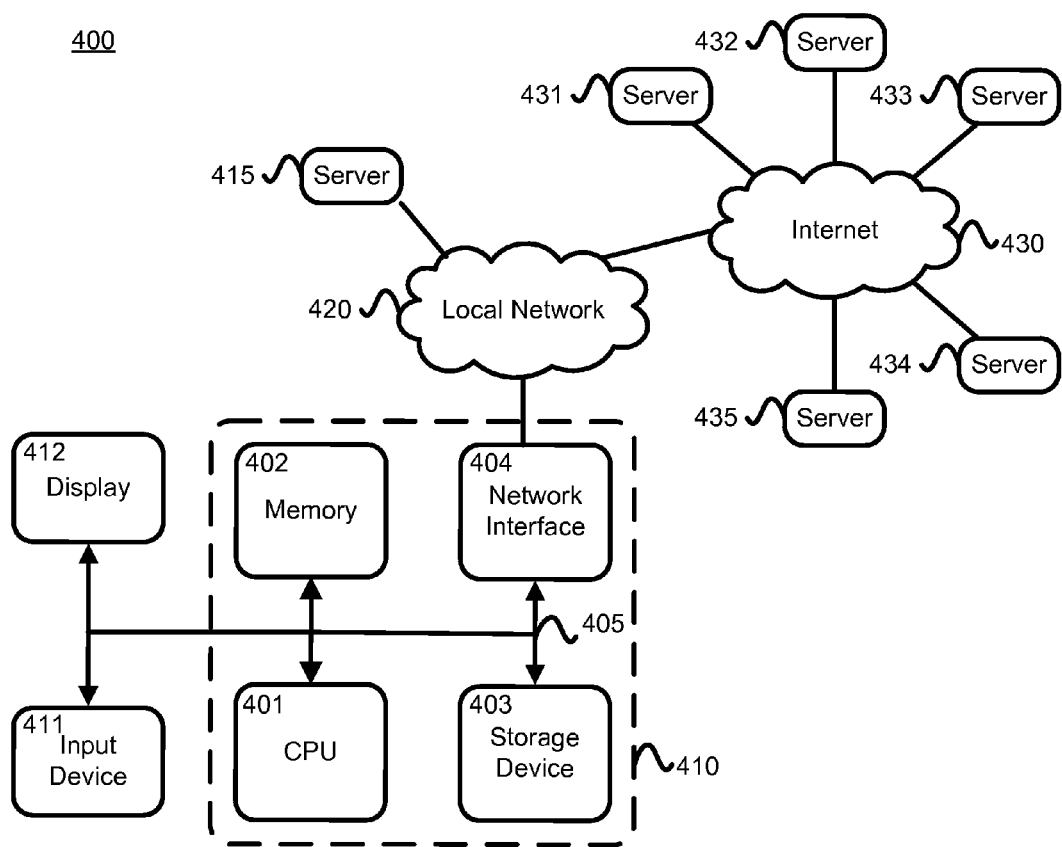
FIG. 4 illustrates a computer system and network that can be used to implement various embodiments of the present invention.

An example computer system 410 is illustrated in FIG. 4. Computer system 410 includes a bus 405 or other communication mechanism for communicating information, and a processor 401 coupled with bus 405 for processing information.

Computer system 410 also includes a memory 402 coupled to bus 405 for storing information and instructions to be executed by processor 401, including information and instructions for performing the techniques and methods described above, for example. This memory may also be used for storing variables or other intermediate information during execution of instructions to be executed by processor 401. Possible implementations of this memory may be, but are not limited to, random access memory (RAM), read only memory (ROM), or both.

A storage device 403 is also provided for storing information and instructions. Common forms of storage devices include, for example, a hard drive, a magnetic disk, an optical disk, a CD-ROM, a DVD, a flash memory, a USB memory card, or any other non-transitory medium from which a computer can read.

Storage device 403 may include source code, binary code, or software files for performing the techniques above, for example. Storage device and memory are both examples of computer readable media.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 804 coupled with bus 805. Network interface 404 may provide two-way data communication between computer system 410 and the local network 420. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud-computing network, which may be programmed with processes described herein.

In an example involving the Internet, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, ABAP, Java, C++ or Perl using, for example, conventional or object-oriented techniques. The software code may be stored as a series of instructions, or commands on transitory and non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for processing a function call comprising:
   receiving, by a computer system, the function call comprising a function group identifier associated with a plurality of functions, and a set of credentials, from a client computer;
   determining, by the computer system, a hook routine associated with the plurality of functions based on the function group identifier;
   executing, by the computer system, a common pre-execution task in response to the hook routine, wherein the common pre-execution task is associated with the plurality of functions and performed before the plurality of functions are executed;
   determining, by the computer system, the set of credentials from the function call;
   retrieving, by the computer system, a customized pre-execution task based on the set of credentials; and executing, by the computer system, the customized pre-execution task after executing the common pre-execution task.

2. The method of claim 1 wherein the common pre-execution task comprises an authorization routine associated with at least some of the plurality of functions associated with the function group identifier.

3. The method of claim 2 wherein the customized pre-execution task comprises an enhanced authorization routine specific to the set of credentials.

4. The method of claim 3 wherein the enhanced authorization routine comprises a security check routine.

5. The method of claim 1 wherein the function call comprises the hook routine, and wherein determining the hook routine comprises detecting the hook routine in the function call.

6. The method of claim 1 further comprising retrieving, by the computer system, the common pre-execution task from a task storage medium based on the group identifier.

7. The method of claim 6 further comprising updating, by the computer system, the common pre-execution task stored in the task storage medium in response to a request received from a user using the client computer.

8. The method of claim 1 further comprising determining, by the computer system, a result of the common pre-execution task.

9. The method of claim 8 further comprising executing or rejecting, by the computer system, a function specified in the function call in response to the result of the common pre-execution task.

10. A server computer comprising a processor, a network interface, and a computer readable medium storing instructions thereon that when executed by the processor cause the processor to:

receive a function call comprising a function group identifier associated with a plurality of functions, and a set of credentials, from a client computer;

determine a hook routine associated with the plurality of functions based on the function group identifier;

execute a common pre-execution task in response to the hook routine, wherein the common pre-execution task is associated with the plurality of functions and performed before the plurality of functions are executed;

retrieve a customized pre-execution task based on the set of credentials; and execute the customized pre-execution task after the executing the common pre-execution task.

11. The server computer of claim 10 wherein the common pre-execution task comprises an authorization routine associated with at least some of the plurality of functions associated with the function group identifier.

12. The server computer of claim 11 wherein the customized pre-execution task comprises an enhanced authorization routine specific to the set of credentials.

13. The server computer of claim 12 wherein the enhanced authorization routine comprises a security check routine.

14. The server computer of claim 10 wherein the function call comprises the hook routine, and wherein to determine the hook routine the processor detects the hook routine in the function call.

15. The server computer of claim 10 wherein the instructions further cause the processor to retrieve the common pre-execution task from a task storage medium based on the function group identifier.

16. The server computer of claim 15 wherein the instructions further cause the processor to update the common pre-execution task stored in the task storage medium in response to a request received from a user using the client computer.

17. The server computer of claim 10 wherein the instructions further cause the processor to determine a result of the common pre-execution task.

18. The server computer of claim 17 wherein the instructions further cause the processor to execute or reject a function specified in the function call in response to the result of the common pre-execution task.

* * * * *